L. GALLAHER.
INDIRECT SYSTEM OF LIGHTING.
APPLICATION FILED FEB. 25, 1920.
1,363,583.
Patented Dec. 28, 1920.
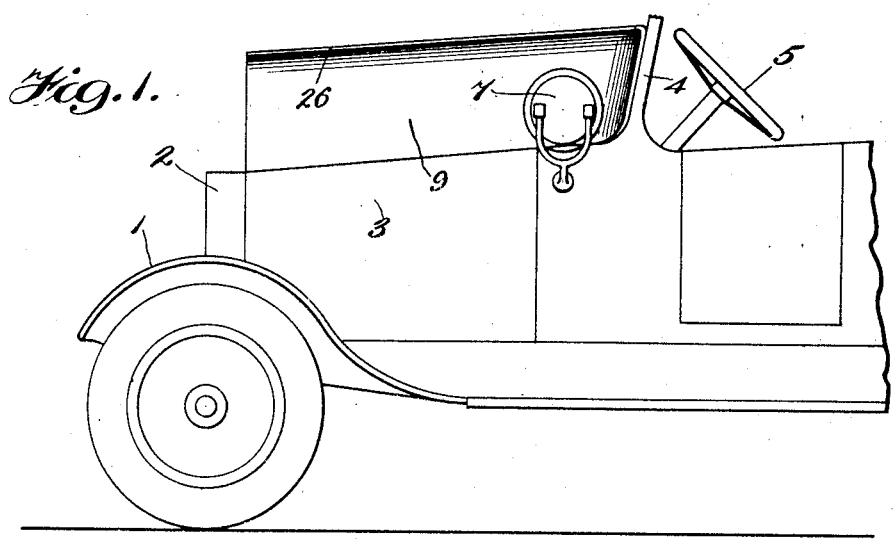
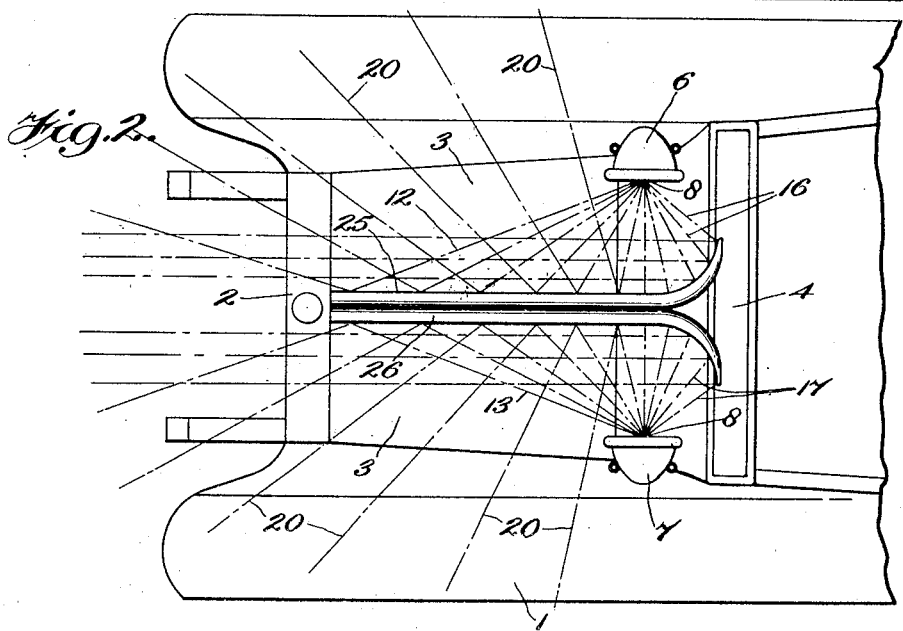
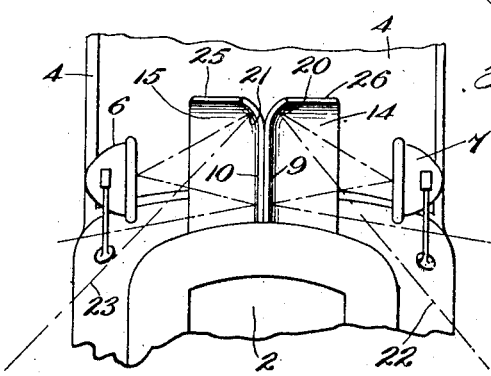
Inventor
Louis Gallaher, by
Attorney

UNITED STATES PATENT OFFICE.

LOUIS GALLAHER, OF PHILADELPHIA, PENNSYLVANIA.

INDIRECT SYSTEM OF LIGHTING.

1,363,583.     Specification of Letters Patent.     Patented Dec. 28, 1920.

Application filed February 25, 1920. Serial No. 361,081.

*To all whom it may concern:*

Be it known that I, LOUIS GALLAHER, a citizen of the United States, residing at Philadelphia, in the county of Philadelphia and State of Pennsylvania, have invented certain new and useful Improvements in Indirect Systems of Lighting; and I do hereby declare the following to be a full, clear, and exact description of the invention, such as will enable others skilled in the art to which it appertains to make and use the same.

This invention relates to lighting systems, especially adapted for automobiles, and has for its object to provide a system which will avoid the objectionable glare, now encountered in present systems, while at the same time make said systems more efficient in practice than those heretofore proposed.

With these and other objects in view the invention consists in the novel details of construction, and combinations of parts, more fully hereinafter disclosed and particularly pointed out in the claims.

Referring to the accompanying drawings forming a part of this specification, in which like numerals designate like parts in all the views:—

Figure 1 is a diagrammatic side elevational view of a portion of an automobile with my invention applied thereto;

Fig. 2 is a plan view of the parts shown in Fig. 1; and,

Fig. 3 is a front elevational view of the parts shown in Fig. 1.

1 indicates an automobile, or other vehicle, to which my invention is applicable, 2 the radiator of said automobile, 3 the hood thereof, 4 the wind shield of said automobile, 5 the steering gear, and 6 and 7 suitable reflectors for the lights 8 of said automobile.

Extending along the top of the hood portion of the automobile, and preferably well up to the wind shield 4 thereof, I provide the reflectors 25 and 26, having the reflecting surfaces 9 and 10, which latter are of a dull finish. These said surfaces may be made of canvas, cotton cloth, they may consist of white painted surfaces or they may be of glass, porcelain or of any other substance which will give a white reflecting surface having a dull finish.

Suitably placed in relation to said surfaces 9 and 10 are the lamp reflectors 6 and 7, as shown, and the positions of said reflectors 6 and 7, relative to the surfaces 9 and 10, are such that a ray of light, such for example as 12, on the one side of the machine, will be cut off, by the surface 10, from an observer on the opposite side of the machine; and a ray of light, such as 13, on the other side of the machine, will be likewise cut off, by the surface 9, from an observer on the first mentioned side of the machine.

The result is that, in no position of an observer in the road in front of a machine can the direct rays from the lamps 8 be seen. Stated in other language, it is not possible for an observer in front of the machine to get a glare from the reflectors 6 and 7. On the other hand, said reflecting surfaces 9 and 10 are curved at their rear portions to form the reflecting surfaces 14 and 15, respectively, so that rays of light such as 16 and 17 are readily reflected in substantially parallel lines in front of the machine. The rays of light that are sent out from the reflectors 6 and 7 and which occupy positions intermediate of the rays 12 and 16, and intermediate of the rays 13 and 17, are reflected from the surfaces 10 and 9, to the side of the road as will be readily understood from the position of the rays 20.

Not only are the reflecting surfaces 9 and 10 extended to provide the curved or parabolic surfaces 14 and 15, but said surfaces 9 and 10 are further extended near their upper portions to provide the curved portions 20 and 21 respectively, which serve to reflect the rays 22 and 23 downwardly into the road, on each side of the machine.

It will now be clear that owing to the peculiar shape of the reflectors 25 and 26, and to the peculiar positions of the lamp reflectors 6 and 7, it is not possible to get a direct view of the lamps 8 when one is in front, or to the side of the machine, no matter what position he may be in.

On the other hand, since the power plant of the machine may be drawn upon to supply as strong rays as are necessary to reflect the proper amount of illumination from the reflectors 25 and 26, I am enabled to light up the road with as great a brilliancy as may be required.

It is obvious that this indirect system of lighting may be applied to other purposes than automobiles, or wheeled vehicles, and it is further obvious that the reflectors 25 and 26 may be placed in other positions than those shown, and therefore, it is not desired to be limited in the above disclosure except as may be required by the claims.

What I claim is:—

1. The combination with an automobile having a hood of a reflecting surface extending lengthwise of said hood and having a finish incapable of giving a glare; a source of light located to one side of and reflecting light across a portion of said hood, onto said surface, and a shield rendering said source of light incapable of being seen by direct vision, substantially as described.

2. The combination with an automobile having a hood of a reflecting surface extending along the top of and lengthwise of said hood, and having a dull finish; a source of light located to one side of said surface, normally reflecting light across said hood onto said surface; and means for shielding said source adapted to prevent it from being seen from in front of said automobile by direct vision, substantially as described.

3. The combination with an automobile of a curved reflecting surface disposed longitudinally of the hood of said automobile and having a dull finish; a source of light located to one side of said surface; and an inclosure preventing said source with the aid of said surface from being seen from in front of or to one side of said automobile by direct vision, substantially as described.

4. The combination with an automobile of a pair of reflecting surfaces having straight and curved portions disposed longitudinally of the hood of said automobile; a source of light for each of said surfaces; and means to shield each of said sources from direct vision from in front of said automobile, substantially as described.

5. The combination with an automobile of a pair of reflecting surfaces having straight and curved portions disposed longitudinally of the hood of said automobile, one of said reflecting surfaces being adapted to deflect the light in a downward direction; a source of light for and located to one side of each of said surfaces; and means to shield each of said sources from direct vision from in front of said automobile, substantially as described.

6. The combination with an automobile of a white reflecting surface disposed longitudinally of the hood of said automobile; a lamp located in front of the windshield near the rear end of said hood and adapted to light the road by reflection from said surface; and a shield for said lamp so positioned that direct rays from said lamp cannot be seen from in front of said automobile, substantially as described.

7. The combination with an automobile of a white reflecting surface disposed longitudinally of the hood, provided with straight and curved portions; a lamp located to one side of said surface and adapted to light the road by reflection from said surface; and a shield for said lamp so positioned that direct rays from said lamp cannot be seen from in front of said automobile, substantially as described.

In testimony whereof I affix my signature.

LOUIS GALLAHER.